US010053089B2

(12) United States Patent
Newman et al.

(10) Patent No.: US 10,053,089 B2
(45) Date of Patent: Aug. 21, 2018

(54) SYSTEM FOR CONTROLLING A VEHICLE BASED ON THERMAL PROFILE TRACKING (71) Applicant: NIO USA, Inc., San Jose, CA (US)

(72) Inventors: Austin L. Newman, San Jose, CA (US); Dennis Polischuk, San Jose, CA (US)

(73) Assignee: NIO USA, Inc., San Jose, CA (US)

(*) Notice: Subject to any disclaimer, the term of this patent is extended or adjusted under 35 U.S.C. 154(b) by 0 days.

(21) Appl. No.: 15/394,919

(22) Filed: Dec. 30, 2016

(65) Prior Publication Data

US 2018/0134281 A1 May 17, 2018

Related U.S. Application Data (60) Provisional application No. 62/422,663, filed on Nov. 16, 2016.

(51) Int. Cl.
B60W 30/08 (2012.01)
B60W 30/045 (2012.01)
B60W 10/04 (2006.01)
B60W 10/20 (2006.01)
B60W 40/10 (2012.01)

(52) U.S. Cl.
CPC .......... B60W 30/045 (2013.01); B60W 10/04 (2013.01); B60W 10/20 (2013.01); B60W 40/10 (2013.01)

(58) Field of Classification Search
CPC .... B60W 30/045; B60W 10/04; B60W 10/20; B60W 40/10
See application file for complete search history.

(56) References Cited

U.S. PATENT DOCUMENTS

| 9,367,067 | B2* | 6/2016 | Gilmore | G05D 1/101 |
|---|---|---|---|---|
| 2007/0088477 | A1* | 4/2007 | Brewer | A01B 69/008 701/41 |
| 2009/0179748 | A1* | 7/2009 | Stephen | B60C 23/0498 340/447 |
| 2011/0148180 | A1* | 6/2011 | Szelag | B60B 7/20 301/1 |
| 2016/0188987 | A1* | 6/2016 | Lisseman | G06K 9/00845 348/148 |
| 2016/0191859 | A1* | 6/2016 | Lisseman | B60K 35/00 348/148 |
| 2016/0368492 | A1* | 12/2016 | Al-Stouhi | B60W 30/18154 |
| 2017/0132334 | A1* | 5/2017 | Levinson | G06F 17/5009 |
| 2017/0151944 | A1* | 6/2017 | Al-Stouhi | B60W 30/0953 |
| 2017/0330044 | A1* | 11/2017 | Telpaz | G05D 1/0088 |
| 2017/0344023 | A1* | 11/2017 | Laubinger | G05D 1/0272 |

OTHER PUBLICATIONS

U.S. Appl. No. 15/394,925, filed Dec. 30, 2016, Newman et al.

* cited by examiner

Primary Examiner — Mussa A Shaawat
(74) Attorney, Agent, or Firm — Sheridan Ross P.C.

(57) ABSTRACT

A control system has at least one thermal imaging sensor configured to track a thermal profile of a wheel of a nearby vehicle and provide data indicative of the thermal profile. The control system also has a computing device including a processor and a memory. The computing device is configured to receive the data from the at least one thermal imaging sensor, determine a wheel angle parameter of the front wheel of the nearby vehicle based on the data, and generate a control command to change at least one of a direction or an acceleration of the vehicle based on the determined wheel angle parameter.

20 Claims, 7 Drawing Sheets

SYSTEM FOR CONTROLLING A VEHICLE BASED ON THERMAL PROFILE TRACKING

PRIORITY CLAIM

This application claims priority under 35 U.S.C. § 119 to U.S. Provisional Application No. 62/422,663, filed on Nov. 16, 2016 which is expressly incorporated by reference herein in its entirety.

FIELD OF INVENTION

The present disclosure relates to a system for controlling a vehicle, and, in particular, to a system for controlling a vehicle based on thermal profile tracking of a nearby vehicle.

BACKGROUND

Presently, autonomous vehicle technology, including advanced driver assistance system (ADAS) technology, is advancing. More and more autonomous vehicles are being put into operation on the roads. In order for autonomous vehicles to operate safely, they must make decisions based on the movement or predicted movement of other vehicles, including other autonomous vehicles and manually-driven vehicles. It is relatively simple for an autonomous vehicle to stay on the road or in a lane, but it is more complicated when the unknown movements of other vehicles are introduced. Thus, it would be advantageous for autonomous vehicles to collect and use information which may be helpful in predicting and/or determining the future motion of another vehicle on the road.

Current autonomous vehicles have an ability to track other vehicles on the road and identify when those vehicles may be traveling in a direction that may lead to a collision. The autonomous vehicle can then attempt to make a control adjustment to avoid the collision. Vehicle tracking typically includes following the body of the vehicle and its heading on the road. A change in motion of the vehicle may be detected after the mass of the vehicle has begun to shift and travel in another direction. The present disclosure is directed to improved systems and methods for tracking vehicles on the road and making determinations regarding the future travel of those vehicles based on collected data which indicates a direction of travel even before the mass of the vehicle has begun to shift.

SUMMARY

In one aspect, the present disclosure is directed to a control system of a vehicle. The control system includes at least one thermal imaging sensor configured to track a thermal profile of a wheel of a nearby vehicle and provide data indicative of the thermal profile. The control system also includes a computing device including a processor and a memory. The computing device is configured to receive the data from the at least one thermal imaging sensor, determine a wheel angle parameter of the front wheel of the nearby vehicle based on the data, and generate a control command to change at least one of a direction or an acceleration of the vehicle based on the determined wheel angle parameter.

In another aspect, the present disclosure is directed to a method of controlling a vehicle. The method includes tracking a thermal profile of a front wheel of a nearby vehicle, and determining a wheel angle parameter based on the tracked thermal profile. The wheel angle parameter is one of a measured wheel angle, a change in wheel angle, or a rate of change in wheel angle. The method also includes evaluating the wheel angle parameter, and adjusting at least one of a direction or an acceleration of the vehicle based on the evaluation.

In yet another aspect, the present disclosure is directed to a vehicle. The vehicle includes a vehicle body, a power system configured to accelerate the vehicle body, a braking system configured to decelerate the vehicle body, a steering system configured to control a direction of the vehicle body, and a control system configured to control at least one of a direction or an acceleration of the vehicle body. The control system includes at least one thermal imaging sensor configured to track a thermal profile of a wheel of a nearby vehicle and provide data indicative of the thermal profile. The control system also includes a computing device including a processor and a memory. The computing device is configured to receive the data from the at least one thermal imaging sensor and determine a wheel angle parameter of the front wheel of the nearby vehicle based on the data. The wheel angle parameter is one of a measured wheel angle, a change in wheel angle, or a rate of change in wheel angle. The computing device is further configured to generate a control command to change at least one of a direction or an acceleration of the vehicle based on the determined wheel angle parameter.

DETAILED DESCRIPTION OF THE PREFERRED EMBODIMENT(S)

Typically, motor vehicles have four or more wheels that each have a tire that is in contact with a road surface. The front wheels are connected to a steering system such that a wheel angle of the front wheels may be adjusted in order to turn and/or shift a path of the vehicle. Wheel angle may refer to an angle of the wheel and tire relative to the longitudinal axis of the vehicle. The front wheels of a vehicle that is traveling straight are generally parallel to the longitudinal axis. When the front wheels are turned, the body of the vehicle follows in the direction of turning. In operation, the wheels are turned to shift the vehicle and deviate from a straight path, such as to move to another lane, turn onto a different road, park the vehicle, etc. Thus, tracking of the vehicle wheels and their angle relative to the rest of the vehicle can provide information about the future motion and location of that vehicle.

The present disclosure provides a system which includes a sensing component and computing component implemented in a vehicle. The sensing component is configured to capture a parameter (e.g., condition, characteristic, state, etc.) of a nearby wheel indicative of an angle of that wheel relative to the rest of the nearby vehicle. This could be done with radar, ultrasonics, LIDAR, camera devices, or other types of sensors. The computing component includes a processing device configured to analyze the captured parameter and determine motion of the nearby vehicle. For example, the computing component is configured to identify a change in direction of the nearby vehicle based on a tracked wheel angle parameter.

By tracking the wheel angle of surrounding vehicles, a computing device on a vehicle can process where the surrounding vehicle was and also detect the angle of the wheels at each instance. For example, the computing device, via processing, could detect a front wheel angle change (and the degree of change) before a human-piloted or autonomous car has even begun to shift its mass, thus giving the vehicle time to make adjustments (e.g., to allow the nearby vehicle enough space to make the lane change, maintain a distance to the nearby vehicle, avoid collision, etc.).

The detected change in direction of the nearby vehicle may be based on a number of analysis techniques, such as by tracking the location of distinctive points on the vehicle, edge detection, distance detection, image comparison, etc. In general, the computing device may detect a change by comparing data to previously captured data to identify changes in wheel angle over time. In some embodiments, the data may be compared to known characteristics of certain changes, such as those associated with known characteristics of a wheel that is turning.

Figure 1:
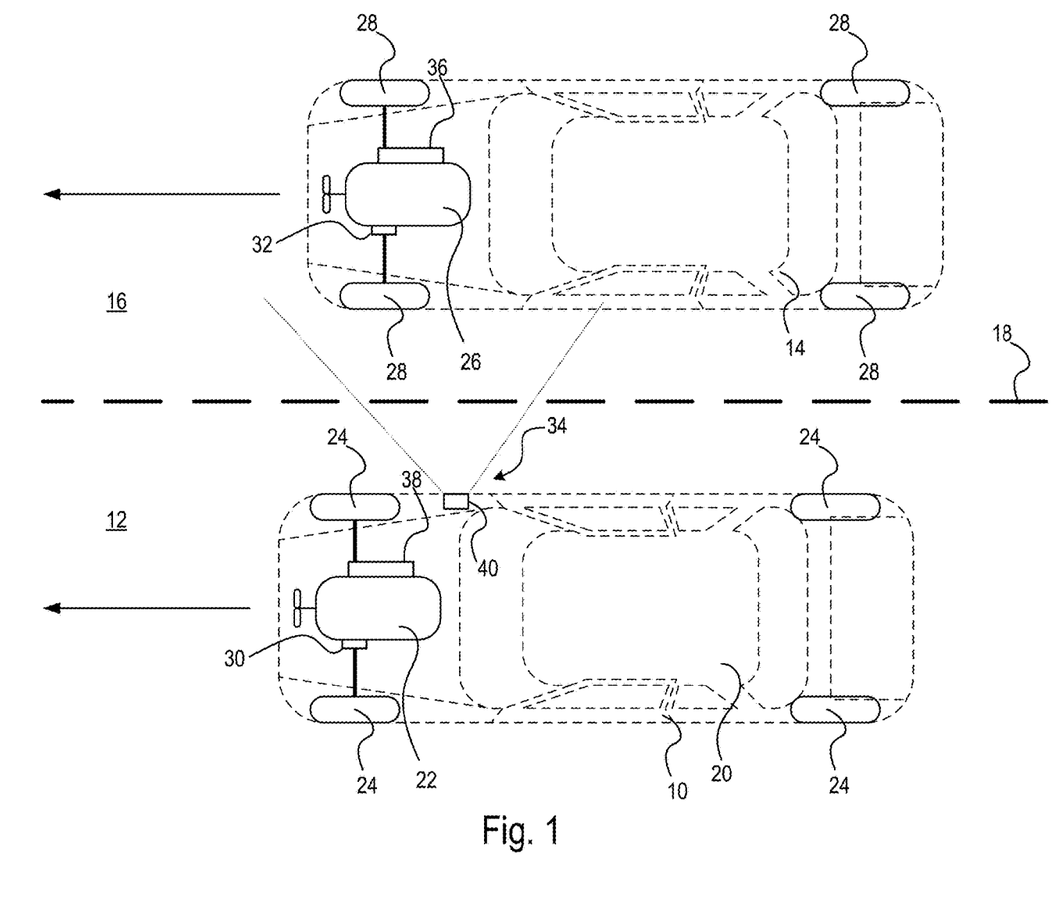
FIG. 1 is a schematic top-view illustration of a pair of vehicles traveling on a road.

FIG. 1 is a schematic illustration of two vehicles traveling on a roadway. In the exemplary scenario depicted in FIG. 1, a vehicle 10 is traveling in a first lane 12 of a road and a nearby vehicle 14 is traveling in the same direction in an adjacent second lane 16 of the road, identifiable via a road marking 18. In an exemplary embodiment, the vehicle 10 includes a system for tracking the nearby vehicle 14. It should be understood that the vehicle 14 may additionally or alternatively include the tracking system described herein. It should be understood that the illustrated scenario of two vehicles traveling in the same direction is exemplary and that the disclosed systems and method may apply equally to other driving situations.

The vehicle 10 includes a vehicle body 20 which may include conventional features including a chassis, outer shell, and interior passenger compartment. The vehicle 10 further includes a power system 22 and a plurality of traction devices 24. The power system 22 includes, for example, a motor and/or an engine, such as an electric motor connected to a battery module for an electric vehicle or an internal combustion engine. The plurality of traction devices 24 include vehicle wheel assemblies (including wheels, tires, etc.) which are driven by the power system 22 to propel the vehicle body 20. The nearby vehicle 14 similarly includes a power system 26 and a plurality of traction devices 28 to propel the nearby vehicle 14.

The vehicle 10 further includes a steering system 30 operably connected to, for example, the front wheels of the plurality of traction devices 24. The steering system 30 includes, for example, interconnected components (e.g., arms, links, rods, pivots, gears, etc.) that are configured to adjust a wheel angle of the front wheels in order to change a direction of the vehicle 10. The steering system 30 may include a steering wheel for manual steering in addition to automated components. The nearby vehicle 14 may similarly include a steering system 32.

The vehicle 10 and nearby vehicle 14 may be autonomous vehicles, manually-driven vehicles, or a combination thereof (e.g., a manually-driven vehicle having at least one ADAS, such as a collision avoidance system). In an exemplary embodiment, the vehicle 10 is at least partially autonomous in that it includes a control system 34 which can implement automated control of the vehicle 10 based on the movement of the nearby vehicle. The automated control may change at least one of an acceleration or a direction of the vehicle 10. The control system 34 allows the vehicle 10 to track the nearby vehicle 14 (or a plurality of nearby vehicles) and make decisions on whether driving adjustments become necessary to accommodate and react to the other vehicles on the road.

The nearby vehicle 14 may include a same or similar control system to that of the vehicle 10. In an exemplary embodiment, the nearby vehicle 14 includes an on-board computer 36. The on-board computer 36 may implement some autonomous control, such as to change an acceleration and/or a direction of the nearby vehicle. In other embodiments, the on-board computer 36 does not provide autonomous control of the nearby vehicle 14.

In an exemplary embodiment, the control system 34 includes at least a controller 38 and at least one sensor 40. The controller 38 may be a computing device configured to generate a control command to change an acceleration (e.g., by braking and/or producing power via power system 22) and/or a direction (e.g, via the steering system 30) of the vehicle 10. The at least one sensor 40 is configured to collect data and/or take measurements to provide to the controller 38 via an operable connection.

The at least one sensor 40 is configured to detect, measure, and/or collect information about surrounding conditions. For example, the sensor 40 is configured to capture information related to a parameter of a surrounding condition and generate a signal indicative of that parameter. The sensor 40 may use, for example, radar, ultrasonic, LIDAR, camera, or other similar technology to capture the information. As shown in FIG. 1, the at least one sensor 40 is preferably directed toward the nearby vehicle 14 such that the collected data is associated with the nearby vehicle 14.

Figure 2:
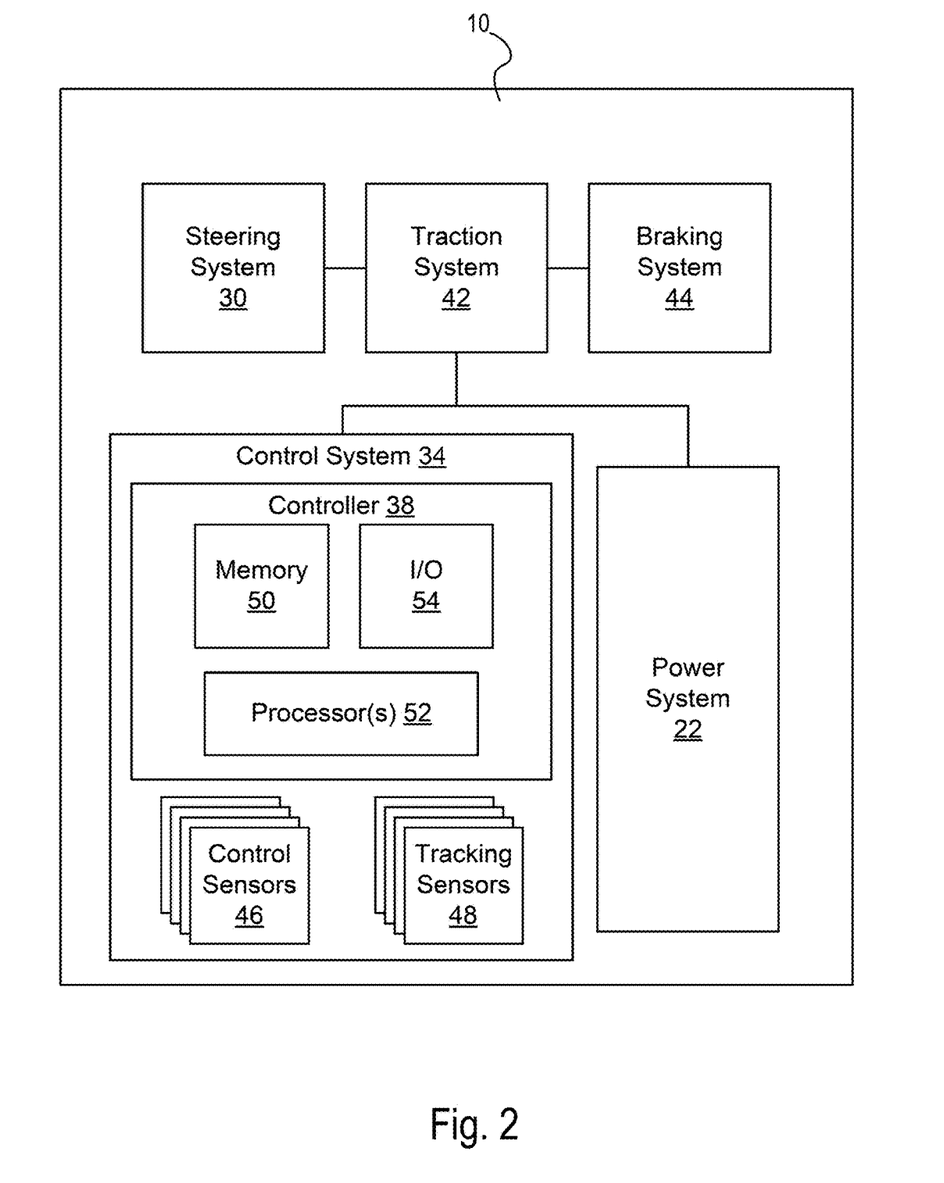
FIG. 2 is a schematic illustration of a vehicle including a plurality of vehicle systems.

FIG. 2 is a schematic diagram of the exemplary systems that may be included as part of the vehicle 10. As previously described, the vehicle 10 may include the power system 22, steering system 30, and control system 34. Each of these systems is operably connected to a traction system 42 which includes the plurality of traction devices 24. In addition, the traction system 42 is operably connected to a braking system 44 which includes one or more brakes configured to slow and/or stop the vehicle 10.

As shown in FIG. 2, the control system 34 includes the controller 38, one or more control sensors 46, and one or more wheel tracking sensors 48. The controller 38 includes computing components, which, in an exemplary embodiment, include a memory 50, at least one processor 52, and an I/O device 54. The controller 38 may be embodied as an onboard computing device in which the processor 52 executes software instructions stored by the memory 50. The I/O device 54 may include input and/or output hardware and/or software which provided acts as a communication port for the controller 38. For example, the I/O device 54 may be an operable connection between the processor 52 and the sensors 46 and/or 48.

The control system 34, including the controller 38 is preferably operably connected to each of the power system 22, the steering system 30, and the braking system 44. In particular, the control system 34 is preferably configured to implement a control command to one or more of these systems in order to automatically control the vehicle 10. For example, the control system 34 is configured to adjust an acceleration of the vehicle 10 through the power system 22 and/or braking system 44 and/or adjust a direction of the vehicle 10 through the steering system 30.

The control sensors 46 are an optional feature which may be included in embodiments in which the vehicle 10 is an autonomous vehicle. The control sensors 46 may include, for example, temperature sensors, engine performance sensors, battery performance sensors, cameras, radar, LIDAR, ultrasonics, etc., for collecting data in an around the vehicle 10 and generating signals which are transmitted to the controller 38. These signals may be indicative of operating parameters, environmental parameters, road parameters, or the like, and which may be provide the controller 38 with information which may be used to operate the vehicle 10. For example, the controller 38 may provide a control command to one of the systems of the vehicle 10 in order to automatically control the vehicle 10 in some manner. In other examples, the controller 38 may provide the information to a driver through the I/O device 54.

The wheel tracking sensors 48 include or consist of the at least one sensor 40 which is configured to detect, measure, and/or collect information about surrounding conditions. The sensor 40 is configured to gather information about the nearby vehicle 14. Consistent with disclosed embodiments, the sensor 40 is configured to gather information which indicates an orientation of a front wheel of the nearby vehicle 14. The sensor 40 is configured to collect the data continuously such that orientation can be tracked over time and a wheel angle parameter can be identified, as will be further described.

Figure 3:
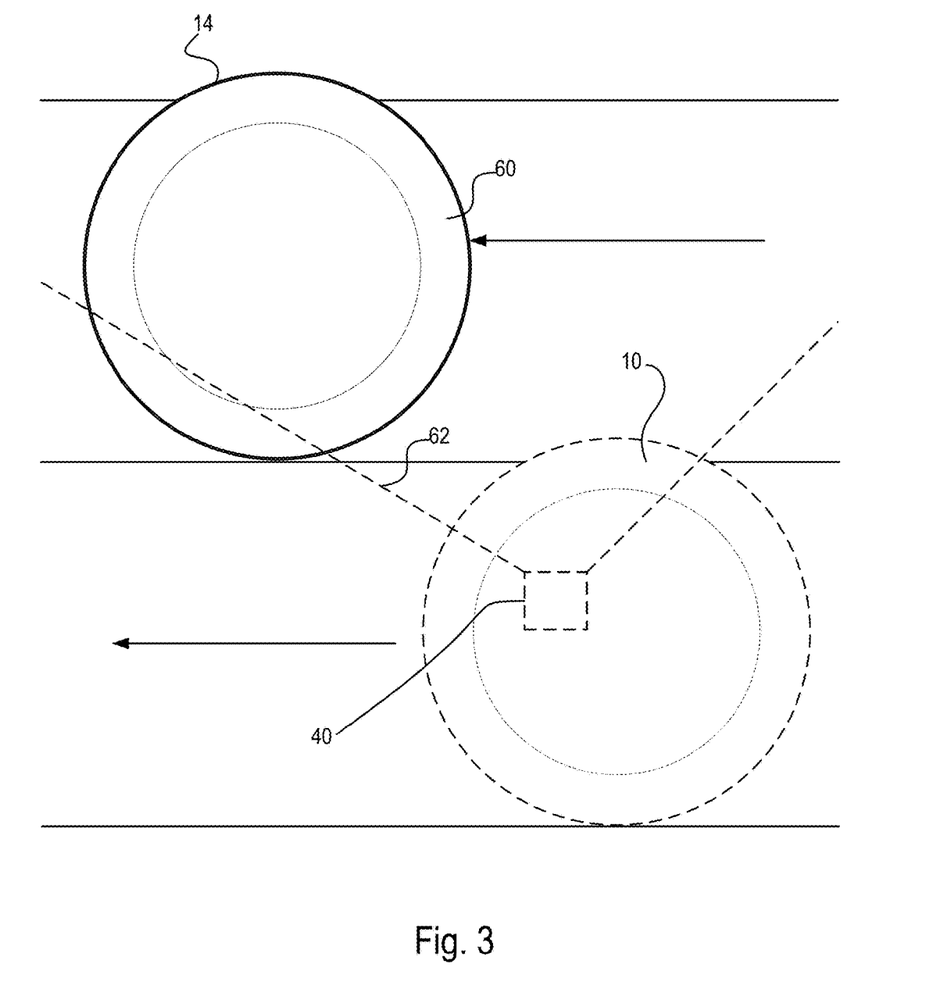
FIG. 3 is a schematic side-view illustration of an exemplary wheel angle detection system.

FIG. 3 illustrates a schematic side view of a wheel angle detection system which includes the sensor 40 being directed toward a front wheel 60 of the nearby vehicle 14. While the sensor 40 is shown connected to a wheel of the vehicle 10, it should be understood that the wheel represents the entire vehicle 10 and that the sensor 40 may be placed anywhere on the vehicle 10, and is not necessarily on a wheel. Moreover, the nearby vehicle 14 includes more components than the front wheel 60, including a body portion adjacent to the front wheel 60 (e.g., wheel well, fender, door panel, running board, etc.).

In an exemplary embodiment, the sensor 40 is configured to capture information in a viewing area 62. The sensor 40 may be configured to move (e.g., articulate) in order to change the viewing area 62. The viewing area 62 represents an area in which the sensor 40 is capable of collecting data and is not limited by the illustrated example.

The sensor 40 is preferably mounted on the vehicle 10 such that the viewing area 62 corresponds to an area near the vehicle 10. For example, the sensor 40 may be configured such that the viewing area 62 is in the vicinity of the front wheel 60 of the nearby vehicle 14. The nearby vehicle 14, as described herein, may be a vehicle in another lane of the roadway (either traveling in the same direction or another direction) on which the vehicle 10 travels. In an exemplary embodiment, the sensor 40 is a thermal imaging sensor (e.g., a thermal imaging camera).

In general, the tires of a vehicle contacting a road surface generate heat as a result of friction between the rubber of the tire and the road surface. This causes the surface temperature of the tire to increase as well as the temperature of the surface of the roadway to increase. A tire in motion thus creates a moving thermal profile which trails behind the tire on the roadway surface. The thermal profile is generated on the surface of the roadway and changes depending on the action of the tire and the characteristic of the road.

In one example, a tire that is traveling in a straight direction may leave a straight-moving thermal profile on the road. If the wheel is turned, the thermal profile will also begin to turn. Similarly, if the vehicle slows or accelerates, the thermal profile will change to reflect the change in speed. For example, the size of the thermal profile may change as the vehicle changes speeds. Identifying these changes (i.e., change in direction, wheel angle, speed, etc.) can help a vehicle predict the movement of a nearby vehicle.

Figure 4:
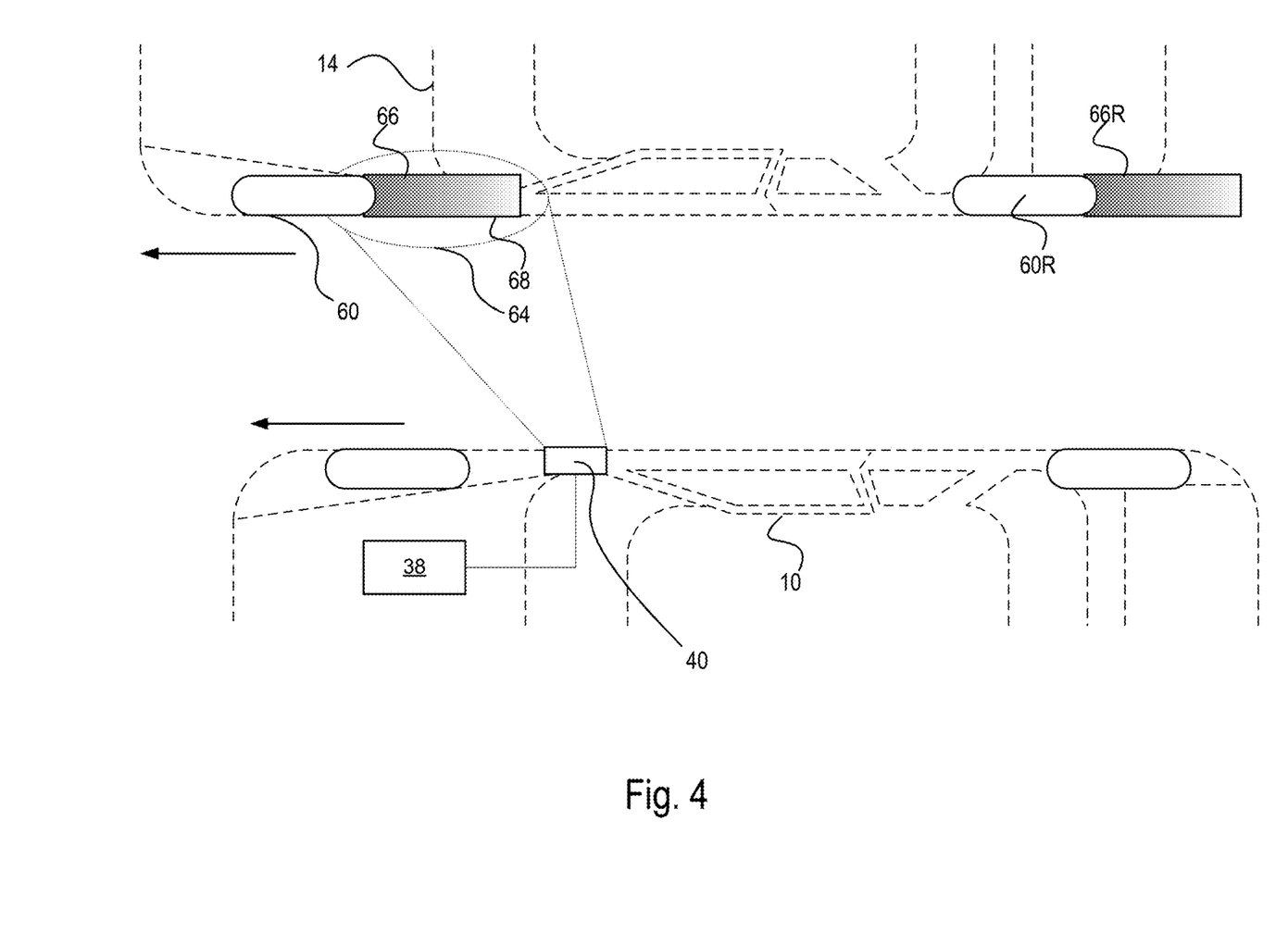
FIG. 4 is a schematic top-view illustration of the disclosed wheel angle detection system, including an opposing vehicle wheel and a corresponding thermal profile.
Figure 5:
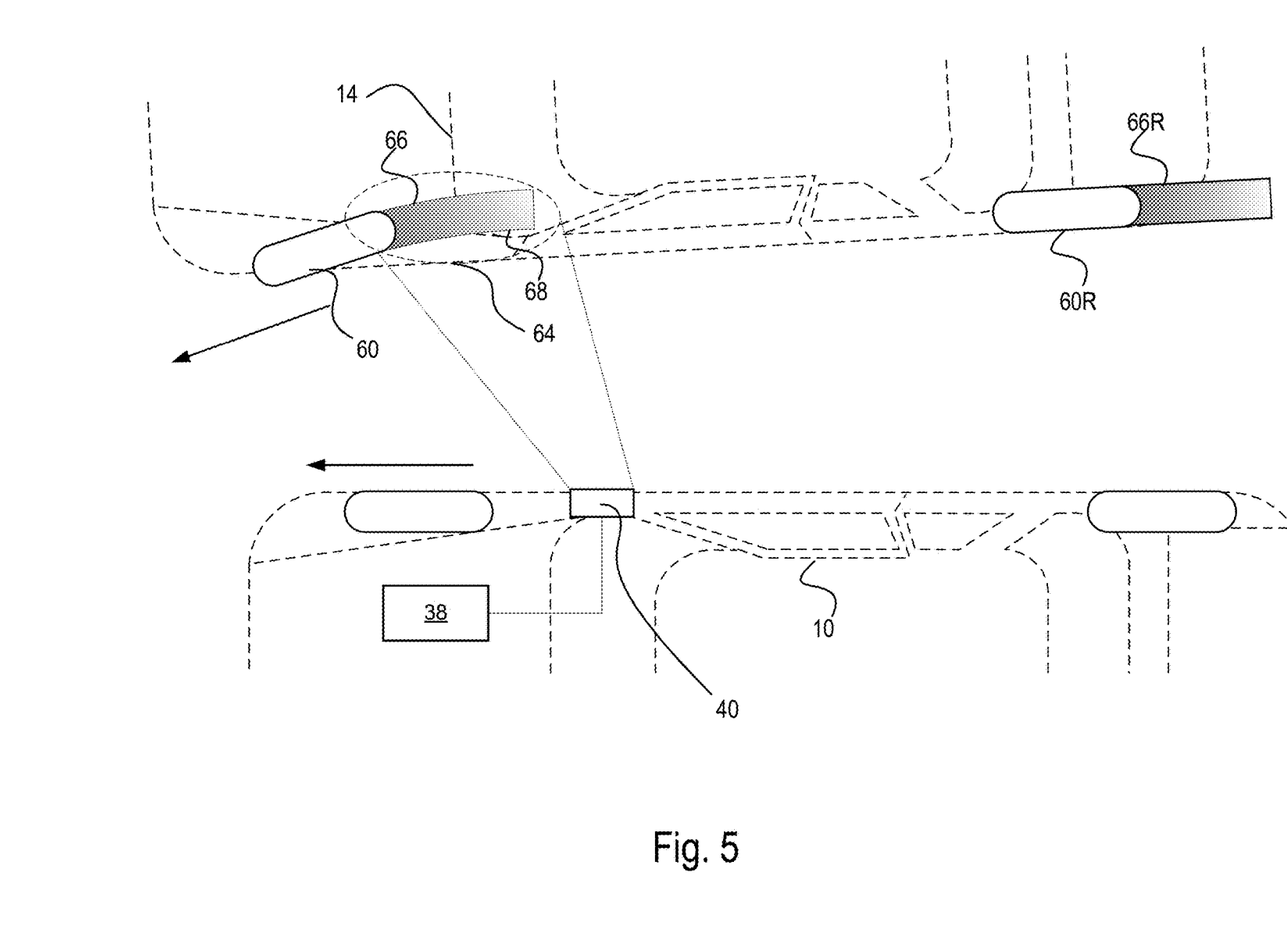
FIG. 5 is a schematic top-view illustration of the wheel angle detection system of FIG. 4, including an opposing vehicle wheel after it has begun to turn and a corresponding thermal profile.

FIGS. 4-5 illustrate an embodiment of the disclosed detection system that tracks a thermal profile of the front wheel 60 of the nearby vehicle 14 in order to determine a wheel angle parameter. In this embodiment, the sensor 40 is a thermal imaging sensor configured to capture a plurality of thermal images in a target area 64. The sensor 40 is configured to track the thermal profile by capturing thermal images when the thermal profile is in the target area 64 and provide data indicative of the thermal profile to the controller 38.

In an exemplary embodiment, the thermal profile is a moving thermal imprint 66 that trails behind the tire of the front wheel 60 as the tire travels on the roadway. In other embodiments, the thermal profile may be some other thermal profile associated with the front wheel 60 or the vehicle 14. For example, the thermal profile may be the thermal profile of the tire itself, the air behind the tire, or another component or feature in the vicinity of the tire (e.g., brake disc). The thermal profile may also include a thermal imprint 66R of the rear tire 60R which may be detected by the same or an additional sensor 40.

In FIG. 4, the nearby vehicle 14 is traveling straight (and/or maintaining a position in its lane). As a result, the tire of the front wheel 60 leaves the thermal imprint 66 on the road surface behind the front wheel 60 of the nearby vehicle 14 which matches the straight path. The thermal imaging sensor that is sensor 40 is configured to capture thermal images of the thermal imprint 66 and provide associated data to the controller 38. The rear wheel 60R likewise leaves a straight path thermal imprint 66R.

In FIG. 5, the nearby vehicle 14 has begun to turn due to a wheel angle change of the front wheel 60. As a result, the thermal imprint 66 also begins to turn in a direction to follow the path of the tire of the front wheel 60. The rear wheel thermal imprint 66R may be angled slightly after the vehicle 14 begins to turn, but may be generally straight, especially at the beginning of the change in front wheel angle. Sensor 40 is configured to continuously capture thermal images of the thermal imprint 66 (and optionally thermal imprint 66R) and provide data to the controller 38. In this example, the data indicates that the front wheel 60 has changed orientation.

In the disclosed embodiment, the control system 34 is configured to control the vehicle 10 based on the tracked thermal profile. The controller 38 is operably connected to the power system 22, steering system 30, and/or braking system 44 such that a control command may be produced to adjust at least of an acceleration or a direction of the vehicle 10 based on the tracked thermal profile.

Figure 6:
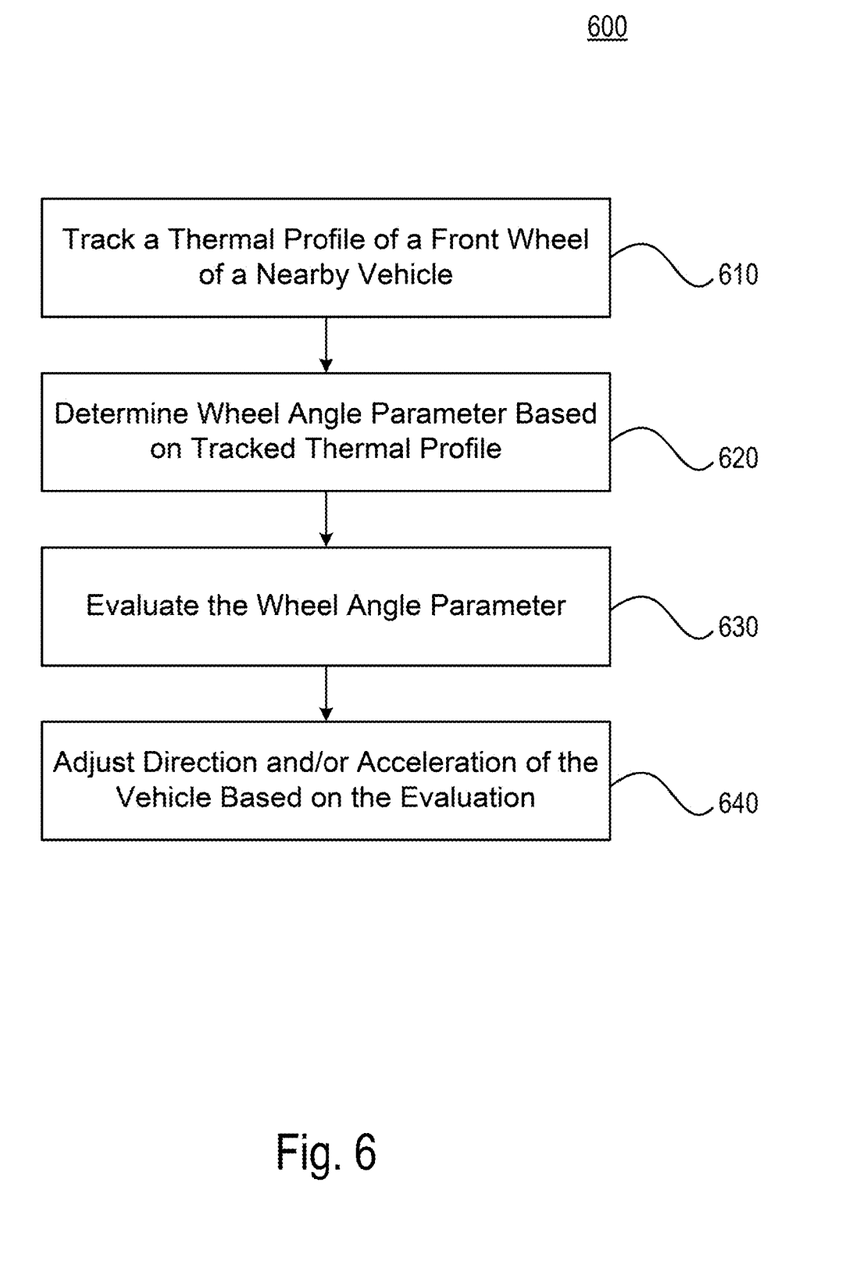
FIG. 6 is a flowchart of an exemplary wheel angle detection process using thermal profile tracking.

FIG. 6 is a flowchart of an exemplary vehicle control process 600 according to the disclosed embodiment. The controller 38 may perform the process 600, such as through the execution of software stored in the memory 50 by the at least one processor 52 and, moreover, based on data received from the at least one sensor 40. It should be understood however, that one or more other components of the control system 34 (or other components) may perform one or steps of the process 600.

In step 610, the controller 38 tracks at least the thermal profile of the front wheel 60 of the nearby vehicle 14. For example, the sensor 40 captures thermal images of the thermal profile. The sensor 40 is preferably directed toward a road surface such that the target area 64 includes the thermal imprint 66. The captured images may include the entire thermal imprint 66 or a portion thereof. In some embodiments, the thermal images include at least an edge 68 of the thermal imprint 66 such that the controller 66 may perform edge tracking. In some embodiments, the same or additional captured images include the rear wheel thermal imprint 66R. The at least one sensor 40 is configured to provide the image data to the controller 38.

In step 620, the controller 38 determines a wheel angle parameter based on the tracked thermal profile. The wheel angle parameter may be a value, classification, or categorization of the front wheel 60. For example, the wheel angle parameter may be one of a measured wheel angle, a change in wheel angle, or a rate of change in wheel angle. The controller 38 is configured to evaluate the wheel angle parameter and determine whether the vehicle 10 should be controlled in some manner due to the wheel angle parameter. For example, the controller 38 may determine that the wheel angle parameter indicates that the nearby vehicle 14 may collide with the vehicle 10 if an evasive maneuver is not performed.

In an exemplary embodiment, the controller 38 determines a wheel angle, a change in wheel angle, and/or a rate of change of wheel angle of the front wheel 60 based on the tracked thermal profile. In one example, the controller 38 determines the wheel angle parameter by analyzing the thermal imprint 66 over time (e.g., across the plurality of captured thermal images).

In an exemplary embodiment, determining the wheel angle parameter may include identifying a change in the path of the thermal imprint 66. For example, the controller 38 may, via an image processing technique, track a path of the thermal imprint 66 and determine when the path begins to deviate (e.g., turn). This may include tracking the edge 68 (or one or more points) of the thermal imprint 66 to identify changes in the path. In other instances, this may additionally include tracking the rear wheel thermal imprint 66R, which may provide a reference to which the front wheel thermal imprint 66 is compared. The controller 38 may use this information to identify a wheel angle parameter. For example, the controller 38 may determine a rate of change of wheel angle based on the path of the thermal imprint.

In another example, the controller 38 may compare the path of the thermal imprint 66 with that of the rear wheel thermal imprint 66R to identify differences between the thermal profiles. Because the orientation of the rear wheel 60R does not change with respect to the vehicle, the thermal imprint 66R can be used as a reference and the pair of thermal imprints 66, 66R can be captured and compared to stored information to identify a wheel angle parameter.

In step 630, the controller 38 evaluates the wheel angle parameter. In one embodiment, the controller 38 compares the wheel angle parameter to a threshold value. For example, if the wheel angle parameter is a value of a rate of change in wheel angle, the controller 38 may compare that value to a threshold rate of change in wheel angle. If the measured value is greater than the threshold value (or vice versa), this may indicate that the nearby vehicle 14 has abruptly steered toward the vehicle 10 and that the nearby vehicle 14 is likely to move out of its lane and into the lane of the vehicle 10.

In some embodiments, the controller 38 may first determine the threshold value. The controller 38 may need to determine the threshold value because the same wheel angle parameter may not indicate the same information depending on the situation. For example, if the vehicles 10 and 14 are not near each other and/or are traveling slowly, a larger wheel angle parameter may be acceptable. In another example, if the road curves at a particular location, the nearby vehicle 14 may be changing a wheel angle to stay within their lane. In this situation, the threshold value may be greater than in situations in which the lane is straight.

The controller 38 may determine the threshold value based on one or more additional detected parameters. The additional detected parameters may be, for example, a distance of the vehicle 10 to the nearby vehicle 14, a speed of the vehicle 10, a speed of the nearby vehicle 14, a path of the road, a condition of the road, and/or a wheel angle parameter of the vehicle 10.

In another example, the controller 38 may use the wheel angle parameter and/or received sensor data to project a path of the nearby vehicle 14. For example, the controller 38 may use the thermal imprint 66 as a predictive feature indicating the future travel of the nearby vehicle 14. The controller 38 may compare the projected path to additional information to determine whether the vehicle 14 may interfere with the path of the vehicle 10. For example, the controller 38 may compare the projected path of the nearby vehicle 14 to a projected path of the vehicle 10. Additionally or alternatively, the controller 38 may compare the projected path of the nearby vehicle 14 to a path of the road. In this way the controller 38 is able to determine whether the vehicle 14 will or could interfere with the vehicle 10 and whether a control command is necessary.

In step 640, the controller adjusts at least one of the direction or the acceleration of the vehicle 10 based on the evaluation of the wheel angle parameter. For example, the controller 38 is configured to accelerate, decelerate, and/or turn the vehicle 10 when the evaluation of the wheel angle parameter indicates that the nearby vehicle 14 will or could reasonably interfere with the path of the vehicle 10. For instance, if the controller 38 determines that the nearby vehicle 14 is going to move into the same lane as the vehicle 10, the controller 38 may provide a control command to the braking system 44 to slow the vehicle 10. The controller 38 may provide similar control commands to the power system 22, steering system 30, or other system of the vehicle 10 in order to adjust a control of the vehicle 10.

In the example in which the controller 38 compares the wheel angle parameter to a threshold value, the controller 38 may determine that the measured value exceeds the threshold value, and, thus, a control adjustment is necessary. In the example in which the controller 38 projects the path of the nearby vehicle 14 based on the wheel angle parameter, the controller 38 may determine that the projected path will interfere with the path of the vehicle 10 and produce a control command to adjust the path of the vehicle 10. In an exemplary embodiment, the control command capability of the controller 38 based on wheel angle detection may be integrated into an autonomous control scheme of the vehicle 10 and/or may be used to override manual driver commands in a vehicle which is being manually-driven. In some embodiments, the control command may produce a warning to a driver regarding the tracked nearby vehicle 14.

Figure 7A:
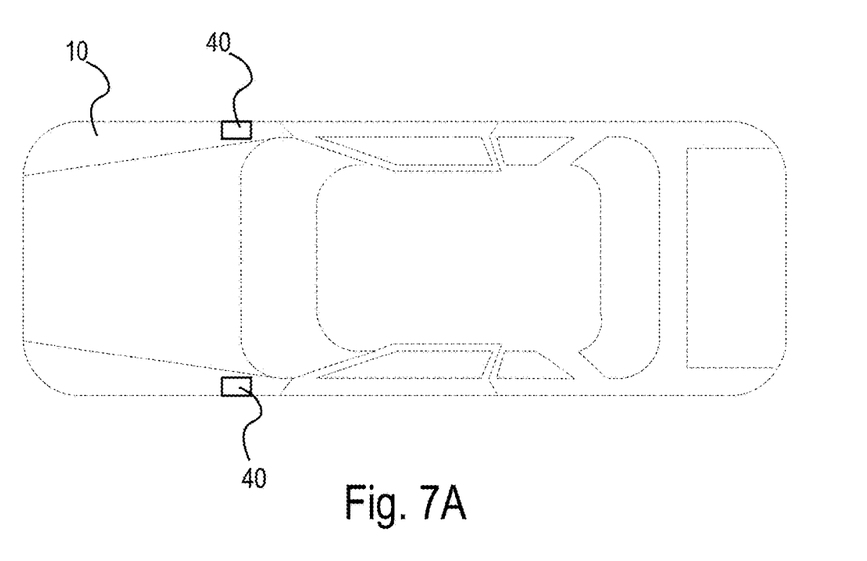
FIGS. 7A and 7B are exemplary sensor configurations for use in a disclosed wheel angle detection system.
Figure 7B:
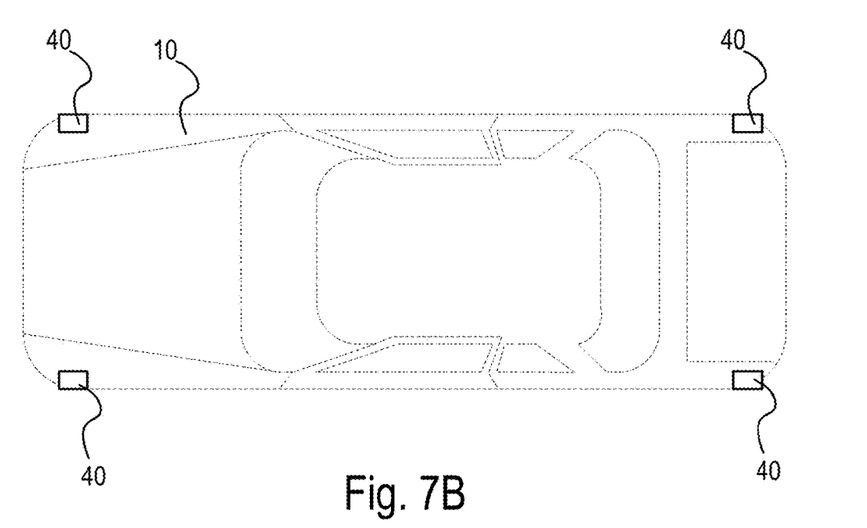

The disclosed embodiments may be implemented in any vehicle 10 in a manner that allows the disclosed methods to be performed. FIGS. 7A and 7B provide exemplary schematic illustrations of detection systems that may include a plurality of sensors 40. FIG. 7A illustrates an embodiment in which two sensors are implemented, one on each side of the vehicle 10. FIG. 7B illustrates an embodiment in which four sensors are implemented, one in each corner area of the vehicle 10. These configurations, while not limiting, provide examples which provide wide-ranging vision to the detection and control system of the vehicle 10, allowing the tracking of multiple vehicles in various locations (i.e., on both sides of the vehicle 10). Moreover, the use of the multiple sensors 40 on the same side allows for tracking of two vehicles on that side and/or may more easily allow for tracking of two wheels (e.g., front wheel 60 and rear wheel 60R) on the same vehicle.

The disclosed systems provide a detection and control system which allows a vehicle 10 to track a nearby vehicle 14 and make control decisions based on information gathered about the behavior of the nearby vehicle 14. This includes tracking a thermal profile of the front wheel in order to identify a wheel angle parameter. The wheel angle parameter provides information which allows the control system to predict movement of the nearby vehicle before the mass of the vehicle has started to move toward an area which may cause a dangerous condition. This provides additional time for vehicle reaction over other tracking systems which may track the movement and/or location of the entire vehicle. This additional reaction time may allow autonomous vehicles to travel safely while on the roads.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A control system of a vehicle, comprising:
at least one thermal imaging sensor configured to track a thermal profile of a wheel of a nearby vehicle and provide data indicative of the thermal profile; and
a computing device including a processor and a memory, the computing device configured to:
receive the data;
determine a wheel angle parameter of the front wheel of the nearby vehicle based on the data; and
generate a control command to change at least one of a direction or an acceleration of the vehicle based on the determined wheel angle parameter.

2. The control system of claim 1, wherein the wheel angle parameter is one of a measured wheel angle, a change in wheel angle, or a rate of change in wheel angle.

3. The control system of claim 1, wherein the thermal profile is a thermal imprint located on a road surface behind the front wheel of the nearby vehicle.

4. The control system of claim 3, wherein determining the wheel angle parameter includes analyzing a path of the thermal imprint over time.

5. The control system of claim 4, wherein determining the wheel angle parameter includes identifying a change in the path of the thermal imprint.

6. The control system of claim 4, wherein the computing device is further configured to project a path of the nearby vehicle based on the path of the thermal imprint, and determine whether to generate the control command based on the projected path.

7. The control system of claim 6, wherein determining whether to generate the control command based on the projected path incudes comparing the projected path of the nearby vehicle to a projected path of the vehicle.

8. The control system of claim 7, wherein determining whether to generate the control command based on the projected path incudes comparing the projected path to a path of the road.

9. The control system of claim 1, wherein the computing device is configured to compare the wheel angle parameter to a threshold value and generate the control command based on the comparison.

10. The control system of claim 9, wherein the computing device is configured to determine the threshold value based on one or more additional detected parameters.

11. The control system of claim 10, wherein the one or more additional detected parameters are selected from the group consisting of: a distance of the vehicle to the nearby vehicle, a speed of the vehicle, and a speed of the nearby vehicle, a path of the road, a condition of the road, and a wheel angle parameter of the vehicle.

12. A method of controlling a vehicle, comprising:
tracking a thermal profile of a front wheel of a nearby vehicle;
determining a wheel angle parameter based on the tracked thermal profile, the wheel angle parameter being one of a measured wheel angle, a change in wheel angle, or a rate of change in wheel angle;
evaluating the wheel angle parameter; and
adjusting at least one of a direction or an acceleration of the vehicle based on the evaluation.

13. The method of claim 12, wherein tracking the thermal profile includes capturing a plurality of thermal images of a target area in the vicinity of the front wheel of the nearby vehicle.

14. The method of claim 13, wherein the target area is an area behind the front wheel of the nearby vehicle and the thermal profile is a thermal imprint on a road surface.

15. The method of claim 12, wherein tracking the thermal profile includes tracking an edge of a thermal imprint on a road surface and determining the wheel angle parameter includes monitoring the edge for changes in direction.

16. The method of claim 12, wherein evaluating the wheel angle parameter includes comparing the wheel angle parameter to a threshold value.

17. The method of claim 12, wherein evaluating the wheel angle parameter includes projecting a path of the nearby vehicle based on the wheel angle parameter.

18. The method of claim 17, wherein evaluating the wheel angle parameter further includes comparing the projected path of the nearby vehicle to a projected path of the vehicle.

19. The method of claim 17, wherein evaluating the wheel angle parameter further includes comparing the projected path of the nearby vehicle to a path of a road.

20. A vehicle, comprising:
a vehicle body;

a power system configured to accelerate the vehicle body;
a braking system configured to decelerate the vehicle body;
a steering system configured to control a direction of the vehicle body; and
a control system configured to control at least one of a direction or an acceleration of the vehicle body, the control system including:
  at least one thermal imaging sensor configured to track a thermal profile of a wheel of a nearby vehicle and provide data indicative of the thermal profile; and
  a computing device including a processor and a memory, the computing device configured to:
    receive the data;
    determine a wheel angle parameter of the front wheel of the nearby vehicle based on the data, the wheel angle parameter being one of a measured wheel angle, a change in wheel angle, or a rate of change in wheel angle; and
    generate a control command to change at least one of a direction or an acceleration of the vehicle body based on the determined wheel angle parameter.

* * * * *